March 27, 1962 F. G. WILLOX 3,027,118
RAM JET PROPELLED AIRCRAFT
Filed Jan. 13, 1960 2 Sheets-Sheet 1

Inventor:
Frank Gerrie Willox
By: Stevens, Davis, Miller & Mosher
Attorneys

3,027,118
RAM JET PROPELLED AIRCRAFT

Frank Gerrie Willox, Lytham St. Annes, England, assignor to The English Electric Company Limited, London, England, a British company
Filed Jan. 13, 1960, Ser. No. 2,229
Claims priority, application Great Britain Jan. 28, 1959
2 Claims. (Cl. 244—15)

The present invention relates to a ram jet propelled aircraft designed to fly at very high supersonic speeds.

According to the invention the ram jet propulsion engines are structurally integrated with the fuselage, the front end of which forms an isentropic intake followed by a diffuser and at the rear by compartments for individual or twin ram jet engines, these compartments being formed by structural members of the fuselage on top, bottom and sides, and by splitter plates fixedly connecting the said top and bottom. Convergent-divergent propulsion nozzles are formed at the rear ends of these compartments.

The aircraft comprises a rectangular profile fuselage body of approximately constant depth, but increasing in width towards the rear so that favourable aerodynamic interference lift is obtained between the body and a wing arranged on top of said fuselage, by generating pressure waves which act favourably on the said wing.

The intake arranged at the front end of the fuselage is an asymmetric, double sided, compression intake. The top wedge, which is fixed relative to the fuselage, extends upstream of the lower wedge, which is articulated in such a manner that it can be tilted towards the upper wedge at Mach numbers below design value thus decreasing the internal contraction ratio. At subsonic and low supersonic speeds this results in a decrease in intake drag compared to that obtained with lower wedge fixed in the design position.

At low supersonic Mach numbers an oblique shock is generated downward by the upper wedge, and a normal shock is generated between the lip of the lower wedge and the undersurface of the upper wedge. In order to operate efficiently at high Mach numbers, the intake is so designed that as the Mach number increases the normal shock gradually moves aft till it reaches the inlet throat at the design Mach number. To achieve this, air is spilled around the sides of the intake at supersonic Mach numbers below design value. By tilting the lower wedge towards the upper one so that the throat area is increased, and the frontal area between the lip of the lower wedge and the undersurface of the upper wedge is decreased, the amount of air to be spilled is considerably reduced and the intake is assisted in swallowing the normal shock. To facilitate the spillage of air round the sides of the intake at low supersonic speeds the intake cross-section is made approximately square. Spillage is also assisted by creating a cross-flow effect outward from the vertical intake centre-plane by slightly sloping the intake compression surfaces; this creates a small pressure gradient across the intake away from the said centre-plane which results in the air tending to flow outward round the intake side walls. To stop this pressure gradient from causing spilling at design and supercritical conditions, the leading edges of the fuselage side walls at the air intake are swept along the shock waves emanating at the design Mach number from the lips of the upper and lower wedges.

This intake has a high pressure recovery coupled with low drag at off design conditions, and the starting problems normally associated with an internal compression inlet are solved by the arrangement described.

Between the upper and lower structural surfaces of the top wedge of the intake a control compartment is situated. Aft of the intake throat a diffuser of a width increasing over the whole of its length is arranged in order to decrease the velocity of the air and so reduce pressure losses due to friction drag. Above the diffuser passage a freight or passenger compartment of approximately constant depth is situated the width of which is equal to that of the fuselage. By suspending this compartment below the wing the floor structure can be economically supported by posts directly from the wing structure. At the rear of the diffuser the propulsion engines are situated which in the present embodiment consists of ram jets only. The ram jets exhaust into variable two-dimensional convergent-divergent nozzles to increase the propulsive efficiency. These nozzles are arranged vertically so that all loads acting on them, except the direct thrust loads, equilibrate out through the nozzle structure, thus reducing the loads to be transferred from the nozzles to the body structure.

To the top of the fuselage the wing is attached the leading edge of which is so shaped that the shocks generated by the sides of the fuselage lie along it, which result in the maximum favourable lift interference between fuselage and wing. At the tips of the wing end plate fins are arranged which extend equally above and below the wing, thereby considerably reducing the loads to be transferred from the fins to the wing structure, and ensuring that the aerodynamic efficiency of the fins is not impaired at high incidence.

In order that the invention may be clearly understood and readily carried into effect an embodiment thereof will now be described with reference to the accompanying drawings in which.

Figure 1:
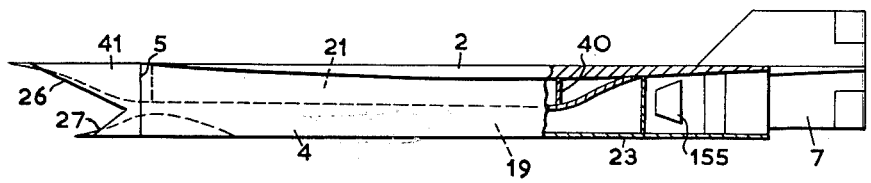
FIG. 1 is a diagrammatic side elevation, partly in section.
Figure 2:
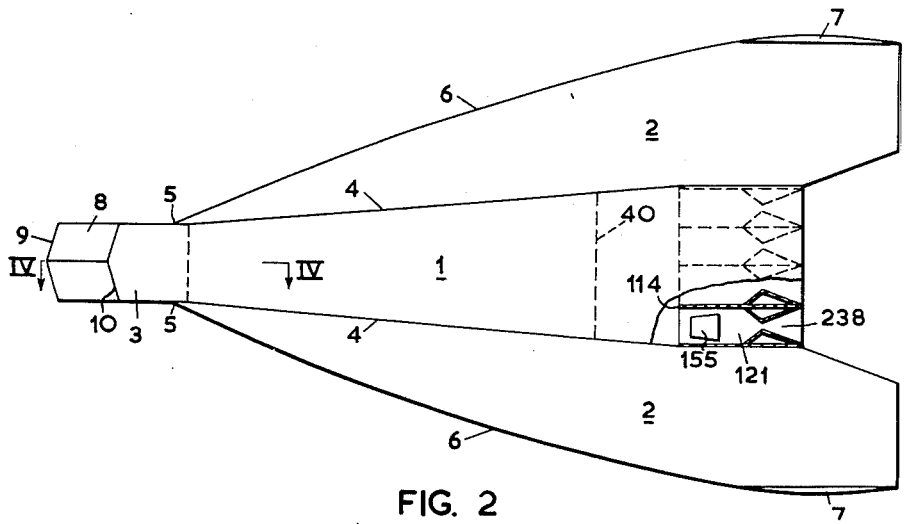
FIG. 2 is an inverted plan view to FIG. 1, partly in section.
Figure 3:
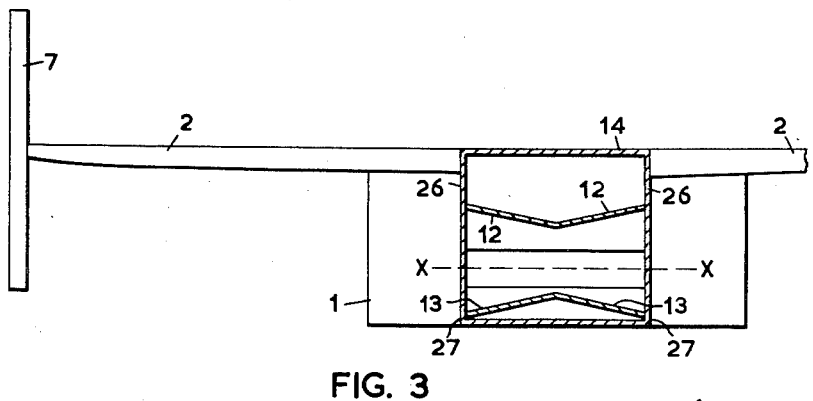
Figure 4:
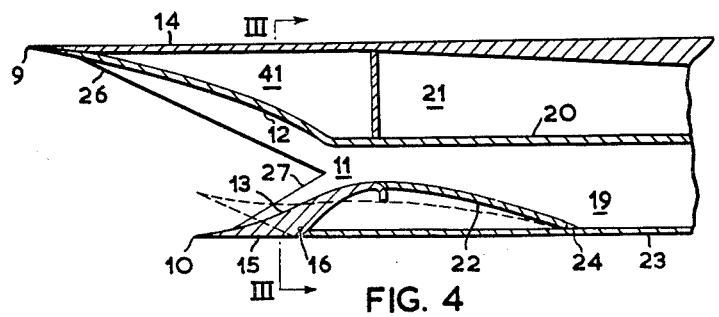
Figure 5:
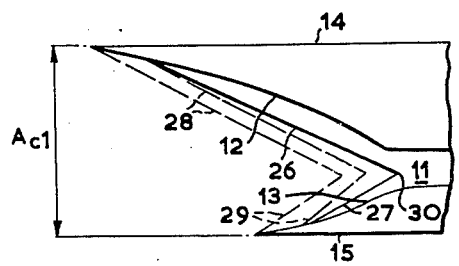
Figure 6:
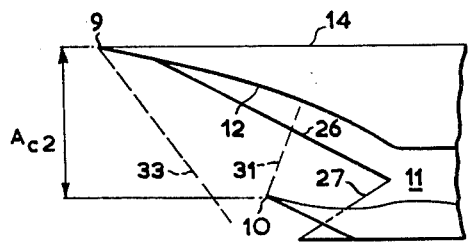

FIG. 3 is a part sectional front elevation in section on the line III—III of FIG. 4, on a larger scale than FIGS. 1 and 2, FIG. 4 is a section of the front end on the line IV—IV of FIG. 2 on the scale of FIG. 3, FIG. 5 diagrammatically shows the aerodynamic conditions for the position of the intake as shown in FIG. 4 in full lines, FIG. 6 similarly shows these conditions for the position as shown in FIG. 4 in dotted lines.

As shown in the drawings, the aircraft comprises a fuselage 1 of rectangular shape suspended below an ogive shaped wing 2. The front end of the fuselage 3 is square in section to satisfy the intake starting requirements. The sides of the fuselage 4 begin to diverge outwards at a small angle just aft of the intake at 5, where they are intersected by the wing leading edges, this results in favourable aerodynamic lift interference between the fuselage and the wing, so increasing the overall aerodynamic efficiency of the design for a given disposable volume.

The shape of the wing leading edge 6 is determined by the requirement that the shock waves generated by the sides of the fuselage at 5 lie along it at the design Mach number; this results in maximum aerodynamic efficiency.

At the wing tips fins 7 are situated, which extend equally above and below the wing 2 with the result that the loads on the top half tend to equilibrate those on the bottom half, so considerably reducing the loads to be transferred from the fins to the wing structure. Also, with these fins there should be no loss in their aerodynamic efficiency as the incidence of the aircraft increases as is the case with fins situated centrally above the fuselage 1.

A compression, asymmetric, double sided, isentropic wedge intake 8 is arranged at the nose of the fuselage 3.

The power plant of the aircraft is arranged at the rear end of the fuselage, and consists of ram jet propulsion engines integrated with the fuselage. Aft of a bulkhead 40 the diffuser 19 diverges further in the vertical direction. The interior of the fuselage is then divided by splitter plates 114 into separate compartments 121, in the forward portions of which ram jet engines 155 are mounted, and the rear portions of which contain adjustable convergent-divergent propulsion nozzles 238.

A control compartment 41 may be provided between the upper and lower structural surfaces 14, 12 of the top wedge of the intake, and a freight or passenger compartment 21 of approximately constant depth and a width equal to that of the fuselage 4 may be provided above the ceiling 20 of the diffuser 19.

This intake is illustrated in more detail in FIGURES 3 to 6. The leading edge of the upper wedge 9 protrudes beyond that of the bottom wedge 10. The intake passage between these wedges and the throat 11 is defined by the isentropic curve boundary members 12 and 13. The outer members 14 and 15 of the intake wedges are flat and at the design condition are approximately parallel to the freestream direction. The upper wedge defined by the members 12 and 14 is fixed relative to the fuselage but the lower wedge defined by the members 13 and 15 is pivotally attached at an axle 16 and is actuated so that it can be rotated to a position shown in FIG. 6, and also in dotted lines in FIG. 4. The leading edges 9 and 10 of the wedges are swept slightly rearward, and the forward facing surfaces of the members 12 and 13 slope slightly outward from the center line as shown exaggeratedly in FIG. 3. In the diffuser 19 region downstream of the throat 11, the upper member 20 defining the diffuser passage is maintained parallel to the freestream direction allowing a maximum volume for the passenger or freight compartment 21, of which it forms the floor. The underside of the diffuser is defined by members 22 and 23. The member 22 is pivotally attached at 24 so that it rotates downward to the position shown in FIG. 4 in dotted lines when the lower wedge is tilted upward, so giving continuity to the passage through the intake.

The intake side wall leading edges 26 and 27 are swept in V-shape so that at the design condition the leading edge shock waves 28 and 29 emanating from the leading edges 9 and 10 of the upper and lower edges lie along them.

FIGURE 5 shows the positions of the intake components at the design Mach number. For this condition the under surface 15 of the lower wedge is aligned with the under surface 23 of the fuselage 4. Thus both wedges are so aligned that their outer surfaces 14 and 15 lie substantially parallel to the freestream direction. Air from the freestream area $A_{c1}$ is compressed by the shock waves emanating from the surfaces 12 and 13. These surfaces are so designed that the shock waves focus on the line X—X of FIG. 3 at 30 FIG. 5. As a result the air entering the intake is compressed isentropically and enters the throat 11 with practically no pre-entry drag. The shock waves 28 and 29 emanating from the leading edges 9 and 10 of the wedges lie along the swept side wall leading edges 26 and 27 of the intake, thus ensuring that there is no spillage drag caused by air spilling round the intake side walls 26 and 27.

To attain this condition at the design Mach number, the intake is so designed that during the acceleration phase from transonic speeds to the design Mach number the internal contraction ratio and spillage flow is such that the normal shock 31 moves aft to the intake throat 11 as the Mach number increases up to the design condition. If the intake did not swallow the normal shock then it would have a low value of pressure recovery and very high drag at the higher Mach number, which disadvantage is obviated by the design according to the present invention.

At subsonic and low supersonic speeds the lower wedge 13—15 is tilted towards the upper wedge 12—14 and take up the position as shown in FIG. 6. The pivot axis 16 for the lower wedge is so chosen that as the latter tilts, the throat area 11 shown in FIG. 5 increases to that shown in FIG. 6, and that the frontal area between the two wedges decreases, thus considerably reducing the internal contraction ratio. This results in a considerable reduction in intake drag at subsonic and low supersonic speeds.

At low supersonic speeds an oblique shock 33 emanates downwards from the lip 9 of the upper wedge and a normal shock 31 is formed between the lip 10 of the deflected lower wedge and the undersurface 12 of the upper wedge, as shown in FIG. 6.

The freestream area entering the intake in this condition is $A_{c2}$. As all the air entering the intake cannot be swallowed by the intake throat it is necessary to spill the excess air round the intake side walls 26 and 27. The amount of air to be spilled is reduced owing to the reduction in internal contraction ratio effected by tilting the lower wedge up.

To assist the spilling of air by the intake 8, its width is made approximately equal to its depth. Also the dihedral on the surface 12 and anhedral of the surface 13 (FIG. 3) create a pressure gradient across these faces away from the intake center-line thus imparting an outward velocity to the air flowing into the intake, and helping it to spill.

In this manner the required contraction and spillage flow can be obtained at Mach numbers between transonic and design values ensuring that the intake continues to operate efficiently as the Mach number increases.

As the Mach number increases the lower wedge 13, 15 is gradually rotated from the position of FIG. 6 to that of FIG. 5 so that the normal shock 31 moves steadily aft to the throat 11.

The embodiment described hereinabove is powered by ram jet propulsion engines only, and has accordingly to be accelerated by external means to a speed where these engines become self supporting. Alternatively the aircraft may be provided with auxiliary propulsion means (not shown) which are operative from standstill or at lower speeds.

What I claim as my invention and desire to secure by Letters Patent is:

1. A ram jet propelled aircraft designed to fly at very high supersonic speed, comprising in combination: a fuselage having top-, bottom- and side-walls, an isentropic air intake having compression surfaces slightly sloping outwardly from the vertical center plane of the said intake arranged at the front end of said fuselage, a divergent diffuser arranged within said fuselage in continuation of the said air intake, splitter plates longitudinally arranged at the rear end of said fuselage structurally connecting the top and bottom walls thereof with one another and enclosing separate compartments between one another and with the said side walls, ram jet propulsion engines arranged and structurally integrated with the said compartments and convergent-divergent propulsion nozzles formed at the rear ends of said compartments.

2. A ram jet propelled aircraft designed to fly at very high supersonic speed, comprising in combination: a fuselage having top-, bottom- and side-walls, an isentropic air intake arranged at the front end of said fuselage having an upper and lower wedge and lips at the said wedges, the compression surfaces of each of said wedges sloping slightly outwardly from the vertical intake centerplane, the said side-walls of the fuselage having leading edges at the said air intake swept back along the shock waves emanating at the design Mach numbers from the lips of the said upper and lower wedges, a divergent diffuser arranged within said fuselage in continuation of the said air intake, splitter plates longitudinally arranged at the rear end of said fuselage structurally connecting the top and bottom walls thereof with one another and enclosing separate compartments between one another and with the said side walls, ram jet propulsion engines arranged and structurally integrated with the said compartments, and convergent-divergent propulsion nozzles formed at the rear ends of said compartments.

References Cited in the file of this patent

UNITED STATES PATENTS

| | | |
|---|---|---|
| 2,944,764 | Lane et al. | July 12, 1960 |
| 2,944,765 | Lane et al. | July 12, 1960 |